United States Patent
Norman et al.

(10) Patent No.: US 7,288,915 B2
(45) Date of Patent: Oct. 30, 2007

(54) ROTOR POSITION DETECTION OF AN ELECTRICAL MACHINE

(75) Inventors: Rosemary Anne Norman, Newcastle-upon-Tyne (GB); Michael Leo McClelland, Leeds (GB)

(73) Assignee: Switched Reluctance Drives Limited, Harrogate, North Yorkshire (GB)

( * ) Notice: Subject to any disclaimer, the term of this patent is extended or adjusted under 35 U.S.C. 154(b) by 379 days.

(21) Appl. No.: 11/024,520

(22) Filed: Dec. 29, 2004

(65) Prior Publication Data

US 2005/0151501 A1   Jul. 14, 2005

(30) Foreign Application Priority Data

Jan. 9, 2004   (GB)   .................... 0400483.4

(51) Int. Cl.
  *H02P 1/46*   (2006.01)
(52) U.S. Cl. ...................... 318/701; 318/432
(58) Field of Classification Search ............... 318/701, 318/432
  See application file for complete search history.

(56) References Cited

U.S. PATENT DOCUMENTS

| | | | | |
|---|---|---|---|---|
| 5,525,886 | A * | 6/1996 | Lyons et al. | 318/701 |
| 5,747,962 | A * | 5/1998 | Fulton | 318/701 |
| 5,923,142 | A * | 7/1999 | Li | 318/701 |
| 5,936,373 | A * | 8/1999 | Li et al. | 318/701 |
| 6,291,949 | B1 * | 9/2001 | Green | 318/254 |
| 6,586,903 | B2 * | 7/2003 | Moriarty | 318/701 |
| 6,586,904 | B2 * | 7/2003 | McClelland et al. | 318/701 |
| 2001/0026139 | A1 * | 10/2001 | Mayes | 318/701 |
| 2002/0089301 | A1 * | 7/2002 | Slater et al. | 318/701 |
| 2003/0111975 | A1 * | 6/2003 | Slater | 318/701 |
| 2004/0046519 | A1 * | 3/2004 | Leonardi et al. | 318/432 |
| 2004/0124806 | A1 * | 7/2004 | Ehsani et al. | 318/701 |

FOREIGN PATENT DOCUMENTS

EP   1 139 560 A   10/2001

OTHER PUBLICATIONS

European Search report for Application No. EP 05 25 0036, dated May 4, 2005.
Mvungi, N.M., et al., "Accurate Sensorless Rotor Position Detection in an SR Motor," EPE Firenze, vol. 1, 1991, pp. 390-393.
Ray, W.F., et al., "Sensorless Methods for Determining the Rotor Position of Switched Reluctance Motors," EPE Brighton, 1993, vol. 6, pp. 7-13.
Stephenson, et al., "The Characteristics, Design and Applications of Switched Reluctance Motors and Drives," PCIM '93, Nürnberg, Germany, Conference & Exhibition, Jun. 21-24, 1993, pp. 1-68.
Panda et al., "Accurate Position Estimation in Switched Reluctance Motor with Smooth Starting," IEEE, 2000, pp. 388-393.

* cited by examiner

*Primary Examiner*—Lincoln Donovan
*Assistant Examiner*—Antony Paul
(74) *Attorney, Agent, or Firm*—Haynes and Boone, LLP (57) ABSTRACT

An electrical machine is controlled without using a physical rotor position detector. When more than one phase is used simultaneously to produce sufficient torque for the application, the increased leakage flux and the reduced permeability of parts of the magnetic circuit distort the information gleaned from diagnostic pulses. By storing sets of characterizing data appropriate to the number of phases in use, the control system is able to determine the rotor position more accurately.

15 Claims, 10 Drawing Sheets

Prior Art

Fig. 4(b)

Prior Art

Fig 5(a)

Prior Art

Fig 5(b)

Prior Art

ROTOR POSITION DETECTION OF AN ELECTRICAL MACHINE

CROSS-REFERENCE TO RELATED APPLICATION

The subject matter of this application is related to the subject matter of British Patent Application No. GB 0400483.4, filed Jan. 9, 2004, priority to which is claimed under 35 U.S.C. § 119 and which is incorporated herein by reference.

BACKGROUND OF THE INVENTION

1. Field of the Invention

This invention relates to the rotor position detection of polyphase electrical machines, and, particularly, but not exclusively, polyphase switched reluctance machines.

2. Description of Related Art

Figure 1:
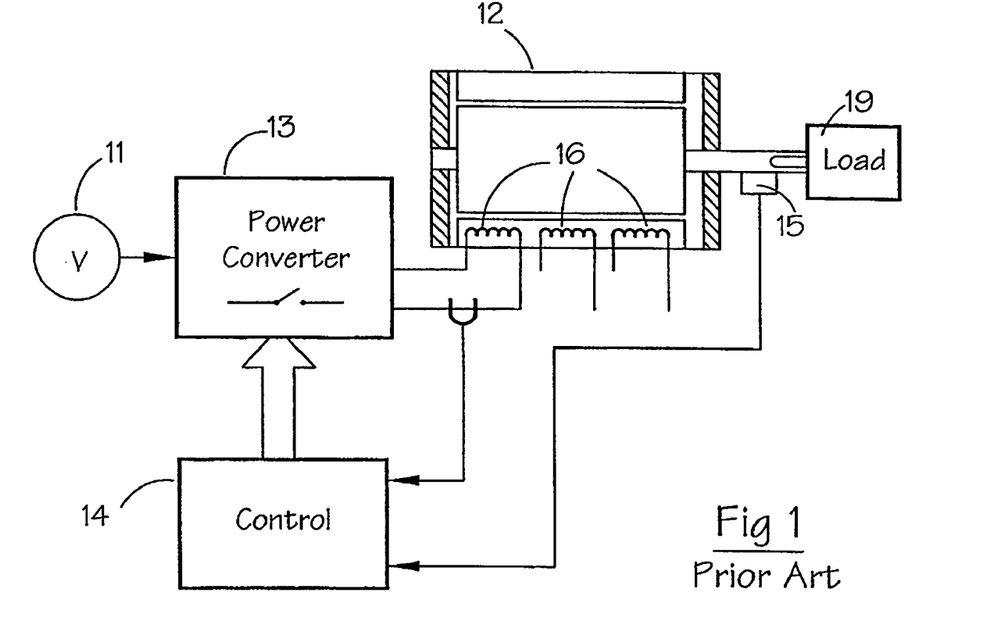
FIG. 1 shows a typical prior art switched reluctance drive.

The characteristics and operation of switched reluctance systems are well known in the art and are described in, for example, "The characteristics, design and application of switched reluctance motors and drives" by Stephenson and Blake, PCIM'93, Nürnberg, 21-24 June 1993, incorporated herein by reference. FIG. 1 shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive, and a rotor position detector 15 is typically employed to supply signals corresponding to the angular position of the rotor.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A resistor 28 is connected in series with the lower switch 22 to provide a current feedback signal. A capacitor 25, known as the "DC link capacitor", is connected across the DC link to source or sink any alternating component of the DC link current (ie the so-called "ripple current") which cannot be drawn from or returned to the supply. In practical terms, the capacitor 25 may comprise several capacitors connected in series and/or parallel and, where parallel connection is used, some of the elements may be distributed throughout the converter. A polyphase system typically uses several "phase legs" of FIG. 2 connected in parallel to energize the phases of the electrical machine.

Figure 2:
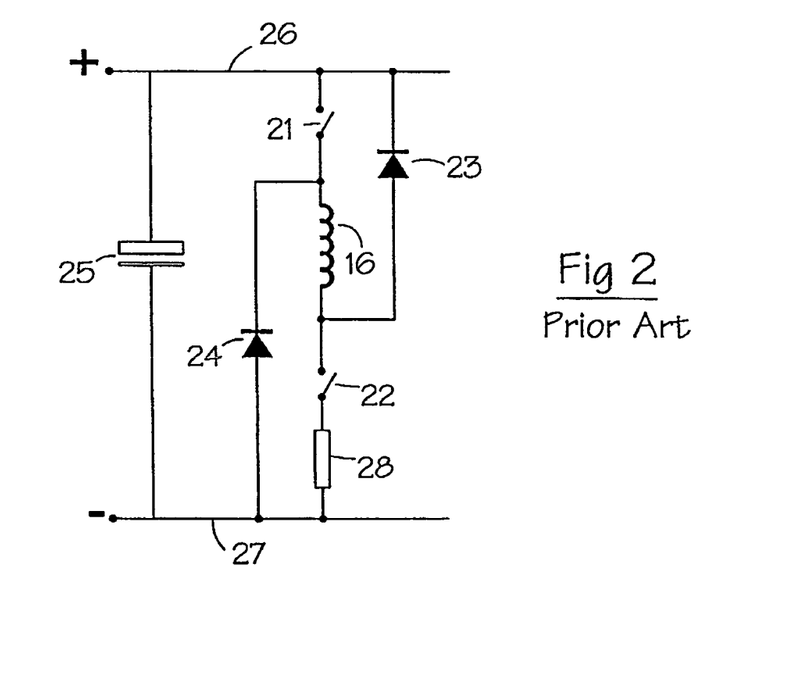
FIG. 2 shows a known topology of one phase of the converter of FIG. 1.
Figure 3A:
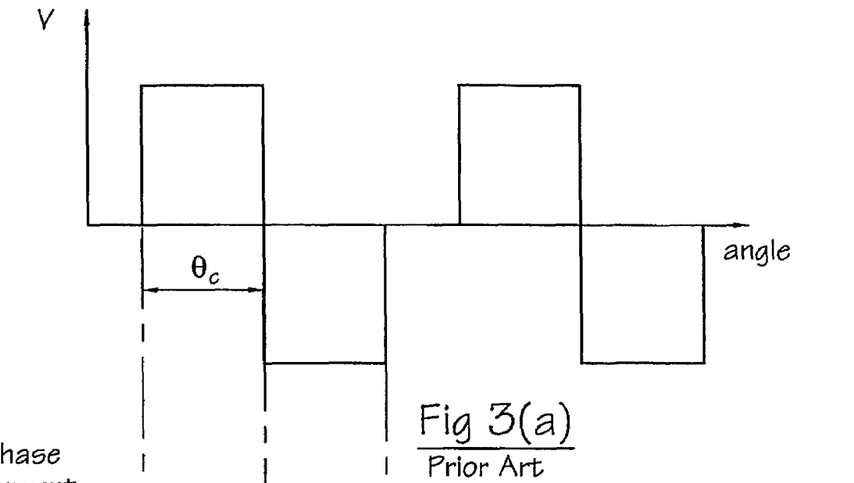
FIG. 3(a) shows a voltage waveform for a switched reluctance machine.
Figures 3B, 3C:
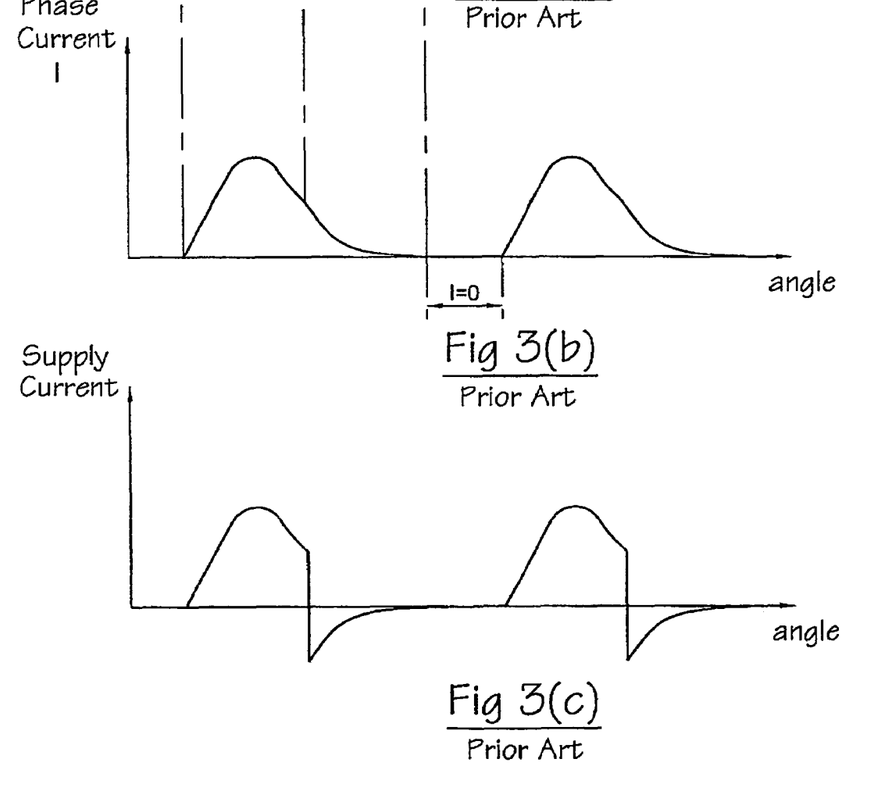
FIG. 3(b) shows a corresponding phase current waveform.
FIG. 3(c) shows a corresponding supply current waveform.

FIG. 3 shows typical waveforms for an operating cycle of the circuit shown in FIG. 2. FIG. 3(a) shows the voltage being applied for the duration of the conduction angle $\theta_c$ when the switches 21 and 22 are closed. FIG. 3(b) shows the current in the phase winding 16 rising to a peak and then falling slightly. At the end of the conduction period, the switches are opened and the current transfers to the diodes, placing the inverted link voltage across the winding and hence forcing down the flux and the current to zero. At zero current, the diodes cease to conduct and the circuit is inactive until the start of a subsequent conduction period. The current on the DC link reverses when the switches are opened, as shown in FIG. 3(c), and the returned current represents energy being returned to the supply. The shape of the current waveform varies depending on the operating point of the machine and on the switching strategy adopted. As is well-known and described in, for example, the Stephenson paper cited above, switching off the switches non-simultaneously gives an operating mode generally known as "freewheeling", in which the current circulates around a loop comprising the winding, one switch and one diode. This technique is used for various reasons, including peak current limitation and acoustic noise reduction.

At zero and low speeds, however, the single-pulse mode is not suitable, due to the high peak currents which would be experienced, and the chopping mode is used. As for single-pulse control, there are two principal variants of the chopping mode. The simplest method is simultaneously to open the two switches associated with a phase winding, e.g. switches 21 and 22 in FIG. 2. This causes energy to be returned from the machine to the DC link. This is sometimes known as "hard chopping". The alternative method is to open only one of the switches and allow freewheeling to occur: this is known as "freewheel chopping" or "soft chopping". In this mode of control, no energy is returned to the DC link from the phase winding.

Figure 4A:
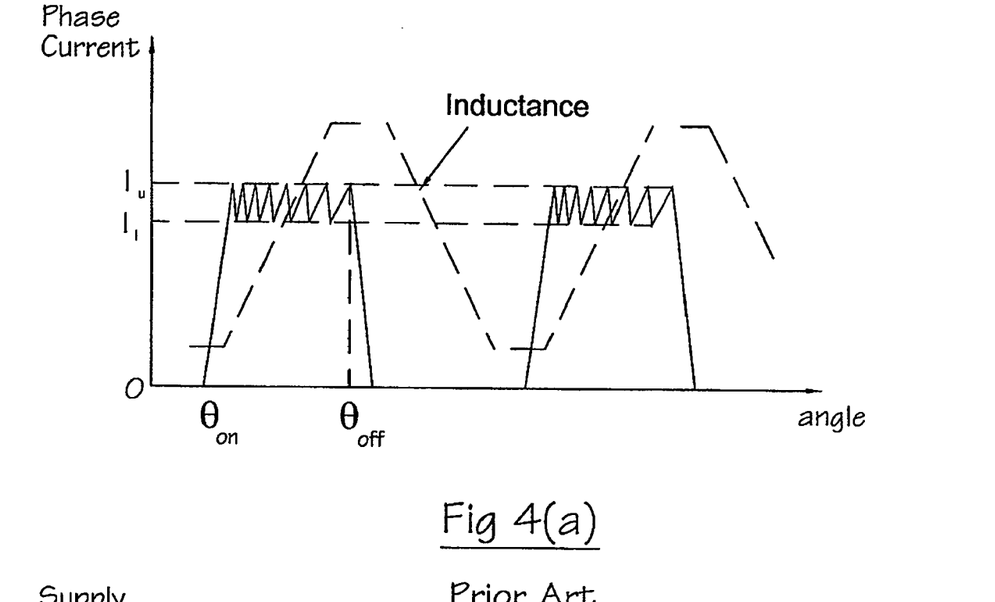
FIG. 4(a) shows typical hard chopping current waveform.
Figure 5A:
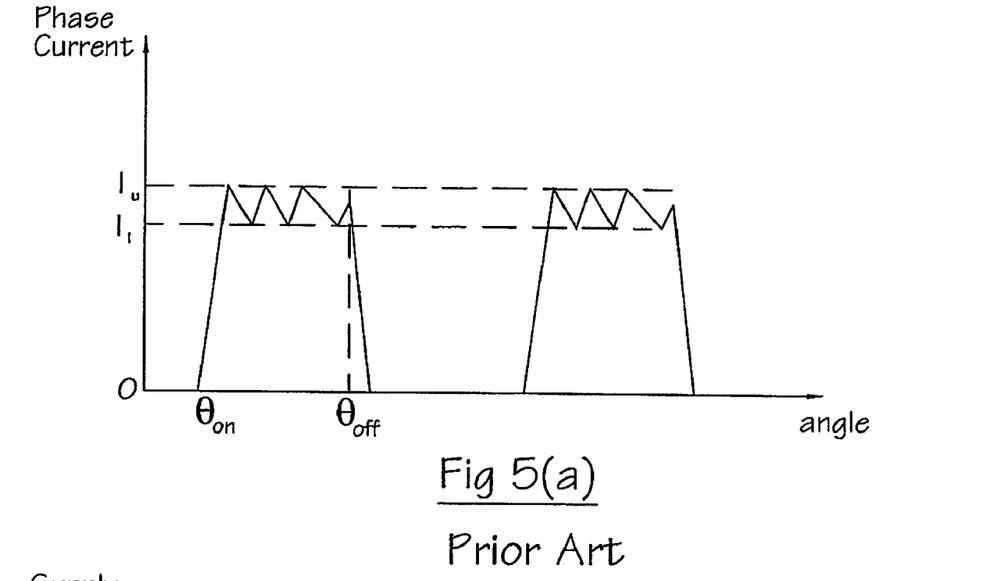
FIG. 5(a) shows typical soft chopping current waveform.

With any chopping scheme, there is a choice of strategy for determining the current levels to be used. Many such strategies are known in the art. One commonly used scheme is to use a hysteresis controller which enables chopping between upper and lower currents. A typical scheme is shown in FIG. 4(a) for hard chopping. At a chosen switch-on angle $\theta_{on}$ (which is often the position at which the phase has minimum inductance, but may be some other position), the voltage is applied to the phase winding and the phase current is allowed to rise until it reaches the upper hysteresis current $I_u$. At this point both switches are opened and the current falls until it reaches the lower current $I_l$ and the switches are closed again, repeating the chopping cycle. FIG. 5(a) shows the corresponding phase current waveform for a hysteresis controller using freewheeling: the reduction in chopping frequency is immediately evident.

Figure 4B:
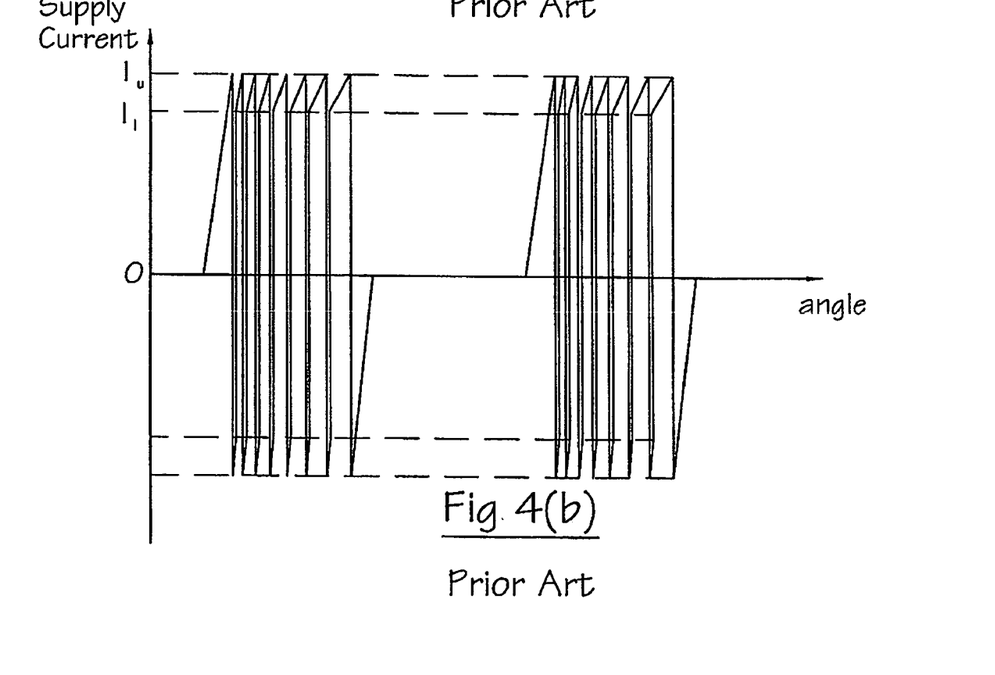
FIG. 4(b) shows a corresponding supply current waveform.
Figure 5B:
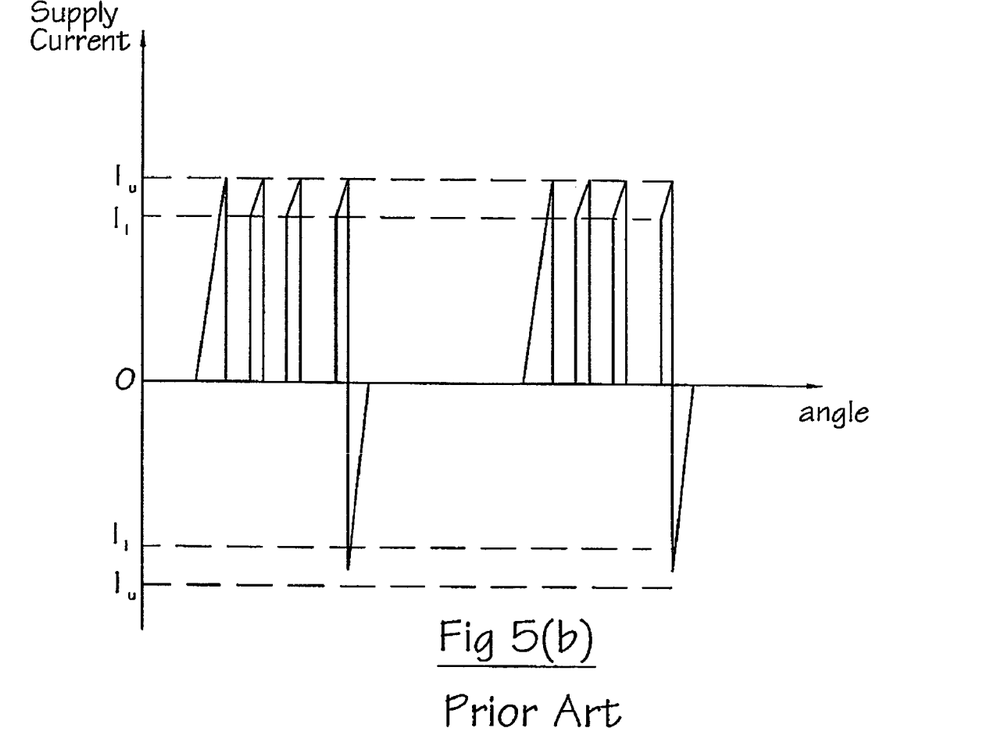
FIG. 5(b) shows a corresponding supply current waveform.

The supply currents flowing in the DC link due to the phase currents in FIGS. 4(a) and 5(a) are shown in FIGS. 4(b) and 5(b) respectively. In each case, the DC link capacitor supplies a proportion of the ac component of these waveforms. It will be understood by the skilled person that these figures are idealized, since the capacitor must have zero mean current. In practice, the behavior of the currents in the presence of supply impedance and capacitor resistance and inductance is considerably more complex.

The phase inductance cycle of a switched reluctance machine is the period of the variation of inductance for the, or each, phase, for example between maxima when the rotor poles and the relevant respective stator poles are fully aligned. An idealized form of the inductance curve for a phase is shown in FIG. 4(a). In practice, the sharp corners would be rounded due to flux fringing and to saturation of the magnetic circuits, and the maximum value of inductance would also be current dependent. Nevertheless, this curve is useful to illustrate the general behavior of the machine.

The performance of a switched reluctance machine depends, in part, on the accurate timing of phase energization with respect to rotor position. Detection of rotor position is conventionally achieved by using a transducer 15, shown schematically in FIG. 1, such as a rotating toothed disk mounted on the machine rotor, which co-operates with an optical or magnetic sensor mounted on the stator. A pulse train indicative of rotor position relative to the stator is generated and supplied to control circuitry, allowing accurate phase energization. This system is simple and works well in many applications. However, the rotor position transducer increases the overall cost of assembly, adds extra electrical connections to the machine and is, therefore, a potential source of unreliability.

Various methods for dispensing with the rotor position transducer have been proposed, several of which are reviewed in "Sensorless Methods for Determining the Rotor Position of Switched Reluctance Motors" by W F Ray and I H Al-Bahadly, published in the Proceedings of The European Power Electronics Conference, Brighton, UK, 13-16 Sep. 1993, Vol. 6, pp 7-13, incorporated herein by reference. In general, the methods fall into two categories: those suitable for low-speed operation and those suitable for high-speed operation.

Where "chopping" current control is the dominant control strategy for varying the developed torque, known methods usually employ diagnostic energization pulses in non-torque-productive phases (i.e. those phases which are not energized directly from the power supply at a particular moment). For example, a method suited to low-speed, chopping mode is that proposed by N M Mvungi and J M Stephenson in "Accurate Sensorless Rotor Position Detection in an S R Motor", published in Proceedings of the European Power Electronics Conference, Firenze, Italy, 1991, Vol. 1, pp 390-393, incorporated herein by reference. Such methods work best at relatively low speeds, where the length of time taken up by a diagnostic pulse is small compared to the overall cycle time of an inductance period. As speed rises, the pulse occupies a longer part of the cycle and soon the point is reached where reliable position information is not available.

In the prior art, the diagnostic pulse technique is generally applied to systems where only one phase is energized at a time. Though this is the conventional, and simplest, method of operation, it does not necessarily provide the highest specific output from the machine. In an attempt to produce the highest possible output, some advanced systems use two or more phases conducting together. In 2-phase systems it is conventional to operate the phases alternately. However, U.S. Pat. No. 5,747,962, commonly assigned to the present assignee and incorporated herein by reference, discloses a method of operating both phases simultaneously over part of the electrical cycle of the machine. In 3-phase machines, it is possible to operate by exciting Phase A alone, then Phase B alone, then Phase C alone. However, to improve both the minimum instantaneous torque and the average torque output of the machine, advantage is often taken of the fact that the torque-productive portions of each phase cycle overlap. Thus, an excitation pattern of A, AB, B, BC, C, CA, A . . . is known to be used. Similarly for 4-phase machines, there are normally always two phases producing torque in the required direction, so phases can be energized in pairs: AB, BC, CD, DA, AB . . . Corresponding rules apply for higher phase numbers, in which it is possible to use three or more phases for at least part of the electrical cycle.

Though such schemes increase the available output of the machine, they have an adverse effect on any sensorless position detection scheme using diagnostic pulses, since the magnetic circuit of the machine is now carrying flux from at least two active phases in addition to the flux associated with the diagnostic pulse in a third phase. Because the magnetic circuit is generally non-linear in its flux/current relationship, the information gleaned from the diagnostic pulse is distorted and this leads to an error in the estimation of rotor position.

There is therefore a need for a reliable method of rotor position detection in, for example, the low-speed chopping mode when more than one phase is being energized over a pre-defined rotor angle.

SUMMARY OF THE INVENTION

Embodiments of the invention provide a compensation for leakage flux in the idle phase. This occurs particularly when two or more other phases are excited simultaneously.

In one form, an embodiment of the invention provides a method of determining rotor position in a polyphase electrical machine in which the phases are separately excitable, the method comprising: applying a diagnostic pulse to an idle phase; integrating the applied voltage in the idle phase to derive a value associated with the idle phase flux linkage; measuring the idle phase current to produce a measured current value; compensating the measured current value for the current due to leakage flux in the idle phase; and deriving a rotor position from the compensated current and the phase flux linkage.

Compensation for current due to leakage flux may include: measuring the current in the idle phase substantially coincident with applying the diagnostic pulse to derive a value indicative of current due to leakage flux, and subtracting the value of the current due to leakage flux from the measured current value to derive the compensated current.

Alternatively, the compensation for current due to leakage flux may include storing pre-characterized values of current for values of rotor position which values of current represent current due to phase flux leakage, and current due to leakage flux; and deriving the rotor position by accessing the stored value of rotor position for the measured current value.

The stored values of current for rotor position can be determined empirically or from theory using, for example, finite element analysis.

Embodiments also extend to a system in which the diagnostic pulse is of substantially constant flux.

Embodiments of the invention also extend to a computer readable medium loaded with a program for performing method embodiments of the invention.

BRIEF DESCRIPTION OF THE DRAWINGS

The invention can be put into practice in a number of ways, some of which will now be described by way of example and with reference to the accompanying drawings in which.

DETAILED DESCRIPTION OF PREFERRED EMBODIMENTS

The illustrative embodiment to be described uses a 3-phase switched reluctance drive in the motoring mode, but any phase number greater than two could be used, with the drive in either motoring or generating mode, i.e. producing output as a torque or force, or as electrical power, respectively.

Figure 6:
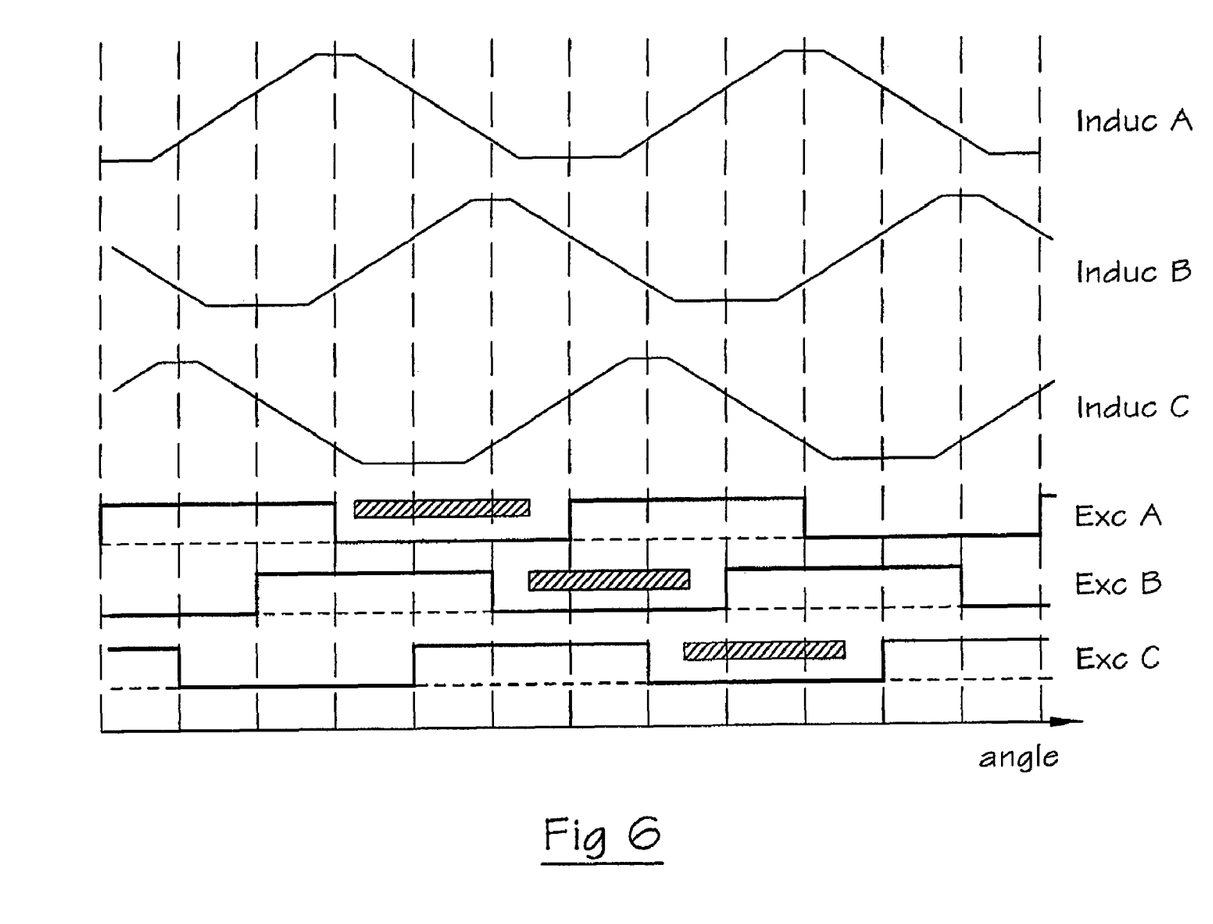
FIG. 6 shows inductance profiles and excitation patterns for a 3-phase switched reluctance machine.

FIG. 6 shows the inductance profiles for the phases of a three-phase switched reluctance machine. As explained in the Stephenson et al paper cited above, positive torque is generated when the inductance curve is rising with increasing rotor angle, so the positive blocks in the excitation patterns Exc A, Exc B and Exc C show when positive torque is available from these phases. If the simple 1-phase-on pattern is adopted, then the transition from, say, Phase A to Phase B can occur any time when there is an overlap between Exc A and Exc B. With a traditional rotor position transducer arrangement, this is typically done at the rising or falling edge of one of the patterns.

Figure 7:
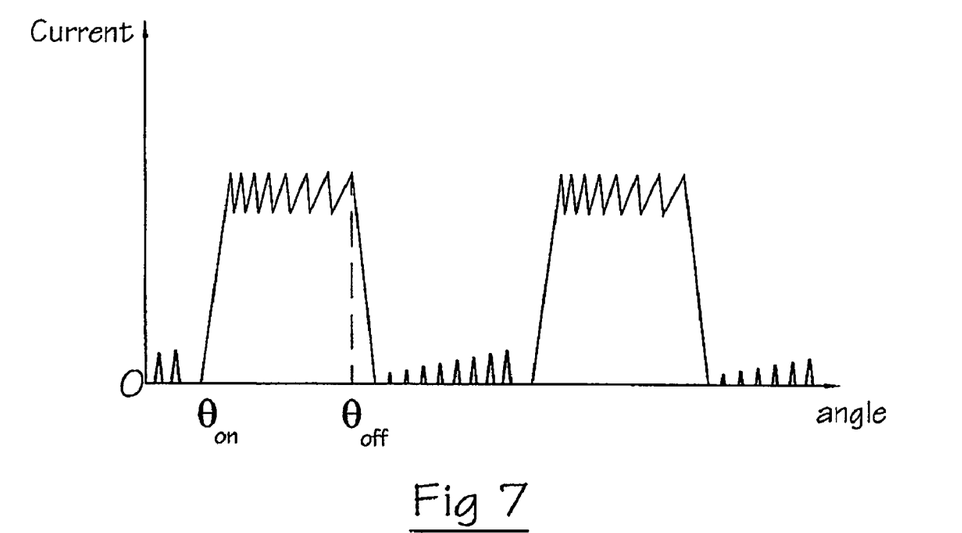
FIG. 7 shows a chopping current waveform with diagnostic pulses.

Using a sensorless position detection system, diagnostic pulses are applied to an essentially idle phase in the portion of the inductance profile for that phase where the inductance is falling. The hatched portions between the excitation blocks show how it is possible to choose a satisfactory position for any rotor angle. FIG. 7 shows a chopping waveform which has diagnostic pulses of fixed flux linkage (i.e. constant voltage-time product) inserted in the gaps between the main, torque-producing current. Of course, the diagnostic pulses also produce torque, although in the opposite direction, but the current is much smaller and so does not generally cause a major disturbance.

By applying diagnostic pulses to the appropriate phase and integrating the applied voltage, the flux-linkage associated with the phase can be evaluated. The integration is performed by hardware integrators or in software. When the output of the integrator (i.e. the flux-linkage) has reached a predetermined level, the current in the idle phase is measured. The phase is then turned off, reversing the voltage across it and applying negative voltage which reduces the flux-linkage (and hence the current) to zero. The measured value of current is then used to index a vector of position which has been stored for that predetermined level of flux-linkage. In this way, a continuous stream of positional information is available from the successions of diagnostic pulses in the phases.

Figure 8:
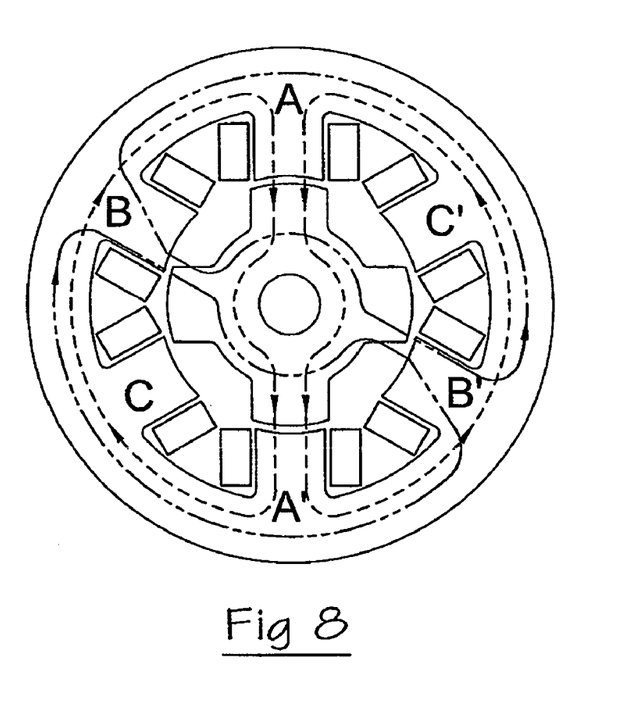
FIG. 8 shows schematic flux paths in a reluctance machine.

Provided only one phase is used at a time for torque production, the above methods are generally sufficiently accurate. However when, say, both phases A and B are being used simultaneously to produce torque, some parts of the magnetic circuit of the machine become heavily used, leading to non-linear behavior. While the particular effects are related to the particular magnetic geometry of any machine, FIG. 8 shows a 3-phase 6/4 machine with idealized flux paths shown with broken lines. It is seen that, for example, much of the stator and rotor back-iron now carries flux from two phases. Typically this causes these parts of the magnetic circuit to operate in non-linear regions and forces flux into leakage paths which include non-energized phases. Such a leakage flux may link the idle phase used for rotor position information.

Thus, if diagnostic pulses are now applied to the third phase, two effects become important which, in combination, distort the information found from the pulses, as follows. Firstly, because the system integrates the phase voltage to estimate the flux-linkage, the diagnostic pulse will be of a known duration. However, there will already be (leakage) flux linking the coils of the phase, so when the switch(es) close to apply the diagnostic pulse, the current immediately steps to a value which supports this flux, regardless of the current which builds up while the diagnostic pulse is building. It follows that, when the integrator output (flux-linkage) reaches its predetermined level, the measured current will be higher than the value which corresponds to the correct rotor position. Secondly, the process of injecting the diagnostic pulse further adds to the flux being carried in the back-iron, leading to reduced permeability for these parts of the magnetic circuit. The diagnostic pulse has now, in effect, lost its calibration since the pre-characterizing information stored for the pulses is no longer accurate.

The combination of these effects leads to a discontinuity in the estimation of rotor position as the excitation pattern changes from one phase number to another and produces a disturbance in the control system.

Embodiments of the invention overcome these difficulties by compensating for the current due to the leakage flux. This can be achieved by subtracting it from the current measured at the end of the diagnostic pulse, or by factoring in the leakage flux when characterizing the machine.

Figure 9:
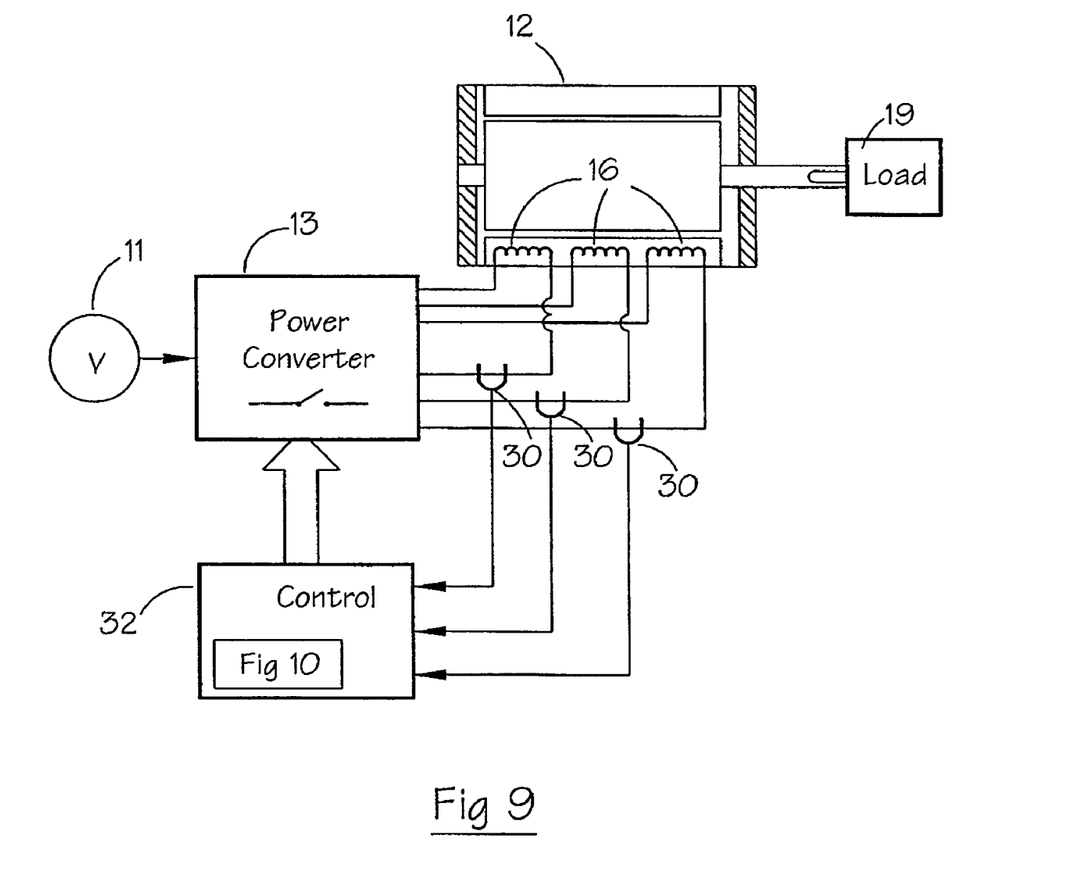
FIG. 9 shows a system embodying one aspect of the invention.
Figure 10:
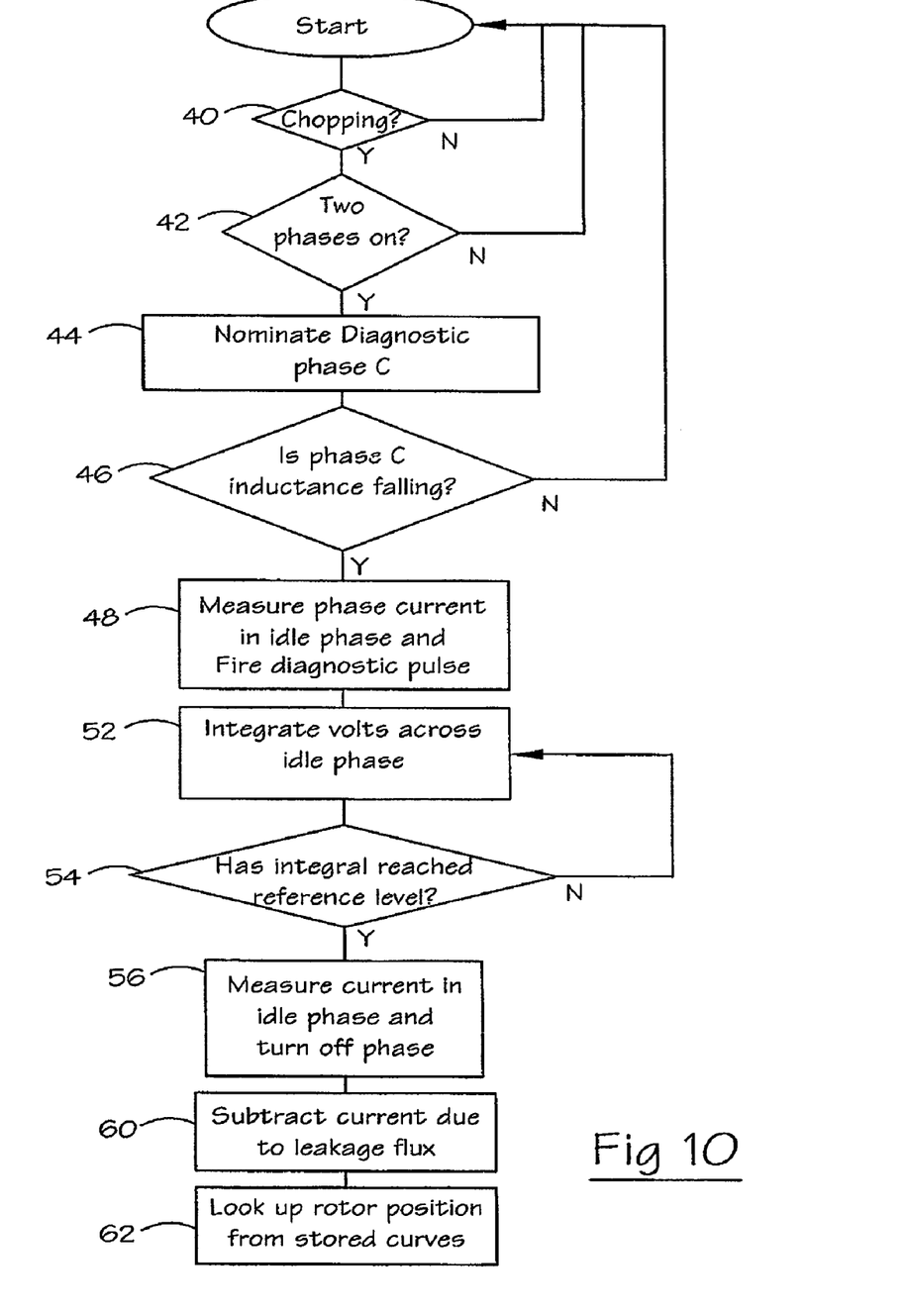
FIG. 10 shows a flow chart embodying one aspect of the invention.

A system for implementing the invention according to one embodiment is shown in FIG. 9. Current sensors 30 are arranged on each of the phases. Otherwise, in terms of hardware, FIG. 9 is a sensorless form of the drive of FIG. 1. FIG. 10 is a flow diagram for operating the processor-based controller 32 of FIG. 9 according to this embodiment of the invention. FIG. 10 is illustrative of the motoring mode of operation. It will be apparent to the skilled person that an equivalent flow chart for the generating mode can be derived.

The compensated sensorless rotor position detection is based on the technique described above in relation to FIGS. 6 and 7. Firstly, the controller determines whether or not the machine is being controlled according to the chopping mode at step 40. Next, at steps 42 and 44, the controller determines whether two phases are active and the output of the machine is above a predetermined level, thereby giving rise to a significant amount of current in the phase being used for the diagnostic pulse due to leakage flux.

If these conditions are satisfied, the idle phase is then assessed according to whether it is in the non-torque producing region in which diagnostic pulses can be applied, i.e. is the inductance in the phase falling as set out in step 46. If not, the controller loops back. If the phase is in the appropriate region, then at step 48 the diagnostic pulse is applied by the controller to the idle phase by actuating the appropriate phase switches of the power converter 13. Simultaneously, the phase current is measured. This is the current due to the leakage flux in the idle phase referred to above.

At step 52 the applied voltage is integrated to derive a value for the flux-linkage associated with the phase. At step 54, the controller checks whether the flux-linkage (the output of the integrator) has reached a suitable predetermined level. If it has not, the system loops back to step 52 to carry on integrating. If the level has been reached, the integration is stopped and the current measured at step 56. At step 60 the current due to the leakage flux is factored out by subtracting it from the current measurement made at step 56. The value of the current, now compensated for the effects of leakage flux, is then used at step 62 to index a vector of rotor position stored for the level of flux linkage at which current was measured.

While the description above has used the test at step 40 of the drive being in chopping mode, any other suitable criterion could be used, e.g. whether or not the speed has crossed a predetermined threshold.

Figure 11:
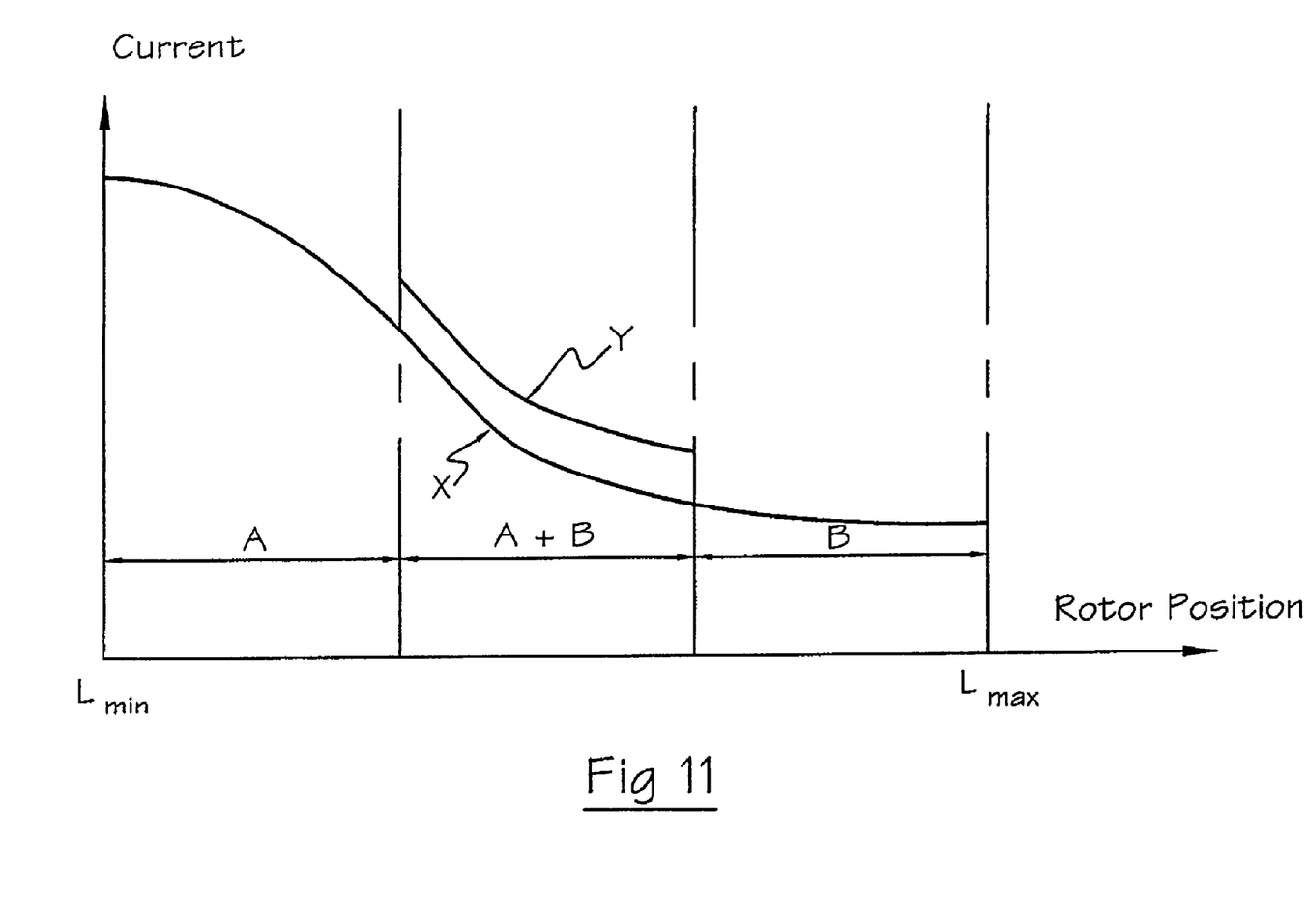
FIG. 11 shows relationships between pulse current and rotor position for a constant flux-linkage.

Alternative embodiments pre-characterize the leakage flux and current and use that information in a way that compensates for the effect of leakage flux on the diagnostic pulse. The pre-characterization can be done empirically by measurement on a machine or by modelling the machine, for example by finite element analysis. This produces results which are exemplified in FIG. 11. FIG. 11 shows the characterizing information for a 3-phase machine where diagnostic pulses of flux-linkage having a peak of 20 mWbT are used. Curve X shows the relationship between diagnostic pulse current and rotor position of Phase C when Phase A or Phase B carry 100 A. Curve Y shows the pulse current when both A and B are on together and both are chopping at 100 A.

In one embodiment, curve X is stored as a vector of position against current, so that position can be read off from the measured pulse current without subtracting the current due to leakage flux, as such. With the benefit of Curve Y (and a knowledge of the switch states to indicate when Curve Y applies), a second table or vector can be set up so that the measured current now gives true rotor position.

Figure 12:
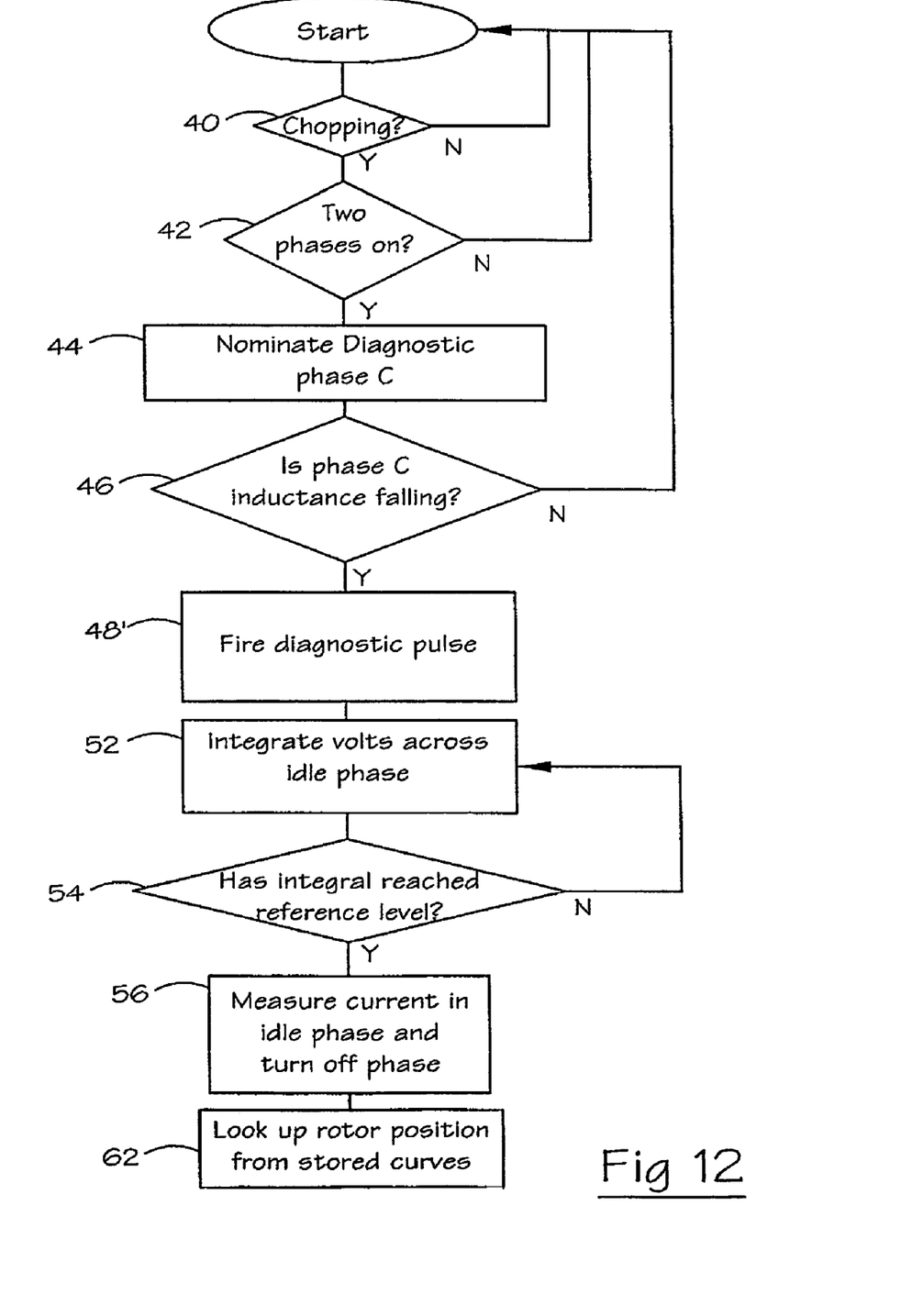
FIG. 12 shows a flow chart embodying another aspect of the invention.

FIG. 12 illustrates a modified form of the flow chart of FIG. 10 in which the modelled current/leakage flux is used. Step 48 is modified and step 60 is omitted from FIG. 10 in this form of the invention. Steps 40 to 62 in FIG. 12 are otherwise the same as those in FIG. 10. At step 62 the measured phase current is applied to a look-up table of curve Y to derive rotor position directly.

If the drive does not always operate with the same level of chopping current, either a series of vectors for each of curves X and Y can be stored or some form of interpolation can be used for either or both curves. It will be appreciated by those skilled in the art that the necessity for the compensation arises principally when the machine is operating at high levels of torque and, therefore, saturation.

In operation, therefore, the control system of the drive operates conventionally when only one phase is chopping and diagnostic pulses are applied to another, the measured pulse current being used to determine rotor position according to Curve X. When the rotor position is such that two phases are called on to produce torque, Curve Y (or an interpolated form of it) is used to correct for the increased amount of leakage flux and to correctly determine rotor position.

The method may be applied with equal benefit to machines operating as motors or as generators and to any machine where phase-related parameters are used for rotor position detection. The method is not specific to one genre of position control algorithms. For example, it could be applied to schemes using diagnostic pulses of substantially constant current, rather than pulses of substantially constant flux linkage, as described above.

The skilled person will appreciate that variations of the disclosed arrangements are possible without departing from the invention, particularly in the details of the implementation of the algorithms in the controller. It will also be apparent that, while the technique has been described in relation to a switched reluctance machine, it can be used in relation to any machine with independently supplied phases.

Also, while the invention has been described in terms of a rotating machine, the invention is equally applicable to a linear machine having a stator in the form of a track and a moving part moving on it. The word 'rotor' is used in the art to refer to the movable part of both rotating and linear machines and is to be construed herein in this way. Accordingly, the above description of several embodiments is made by way of example and not for the purposes of limitation. It will be clear to the skilled person that minor modifications can be made to the control method without significant changes to the operation described above.

What is claimed is:

1. A method of determining rotor position in a polyphase electrical machine in which the phases are separately excitable, the method comprising:
    applying a diagnostic pulse to an idle phase;
    integrating applied voltage in the idle phase to derive a value associated with idle phase flux linkage;
    measuring idle phase current to produce a measured current value;
    compensating the measured current value for the current due to leakage flux in the idle phase; and
    deriving a rotor position from the compensated current and the phase flux linkage.

2. A method as claimed in claim 1 in which compensating for current due to leakage flux includes:
    measuring current in the idle phase substantially coincident with applying the diagnostic pulse to derive a value indicative of current due to leakage flux; and
    subtracting the value indicative of current due to leakage flux from the measured current value to derive the compensated current.

3. A method as claimed in claim 1 in which compensating for current due to leakage flux includes:
    storing pre-characterized values of current for values of rotor position, the values of current representing current due to phase flux linkage and current due to leakage flux;
    wherein the rotor position is derived by accessing the stored value of rotor position for the measured current value.

4. A method as claimed in claim 3 in which the values of current are derived empirically.

5. A method as claimed in claim 3 in which the values of current are derived by finite element analysis of the machine.

6. A method as claimed in claim 1 in which the diagnostic pulse is of substantially constant flux.

7. A method as claimed in claim 1 including applying the diagnostic pulse to the idle phase when at least two other phases are excited together.

8. A system for determining rotor position in a polyphase electrical machine in which the phases are separately excitable, the system comprising:
    means for applying a diagnostic pulse to an idle phase;
    means for integrating applied voltage in the idle phase to derive a value associated with idle phase flux linkage;
    means for measuring idle phase current to produce a measured current value;

means for compensating the measured current value for the current due to leakage flux in the idle phase; and means for deriving a rotor position from the compensated current and the phase flux linkage.

9. A system as claimed in claim 8 in which the means for compensating for current due to leakage flux includes:

means for measuring current in the idle phase substantially coincident with applying the diagnostic pulse to derive a value indicative of current due to leakage flux; and means for subtracting the value indicative of current due to leakage flux from the measured current value to derive the compensated current.

10. A system as claimed in claim 8 in which the means for compensating for compensating for current due to leakage flux includes:

means for storing pre-characterized values of current for values of rotor position, the values of current representing current due to phase flux linkage and current due to leakage flux; and means for deriving the rotor position by accessing the value of rotor position for the measured current value.

11. A system as claimed in claim 8 in which the electrical machine is a switched reluctance machine working as a motor or a generator.

12. A system as claimed in claim 8 in which the means for applying is operable to apply a diagnostic pulse of predetermined magnitude of flux linkage.

13. A system as claimed in claim 8 in which the means for applying is arranged to apply the diagnostic pulse to the idle phase when at least two other phases are excited together.

14. A computer readable medium loaded with a program operable to perform the method of claim 1.

15. A method as claimed in claim 1 in which the electrical machine is a switched reluctance machine working as a motor or a generator.

* * * * *

UNITED STATES PATENT AND TRADEMARK OFFICE
CERTIFICATE OF CORRECTION

| | | |
|---|---|---|
| PATENT NO. | : 7,288,915 B2 | Page 1 of 1 |
| APPLICATION NO. | : 11/024520 | |
| DATED | : October 30, 2007 | |
| INVENTOR(S) | : Norman et al. | |

It is certified that error appears in the above-identified patent and that said Letters Patent is hereby corrected as shown below:

Column 9, Claim 10, Lines 15, the words "for compensating" should be deleted.

Signed and Sealed this

Fifteenth Day of April, 2008

JON W. DUDAS
*Director of the United States Patent and Trademark Office*